Sept. 10, 1929.  A. MOORHOUSE  1,727,999
MOTOR VEHICLE
Filed March 31, 1923   2 Sheets-Sheet 1

Inventor:
ALFRED MOORHOUSE,
By
Attorney

Sept. 10, 1929.  A. MOORHOUSE  1,727,999
MOTOR VEHICLE
Filed March 31, 1923  2 Sheets-Sheet 2
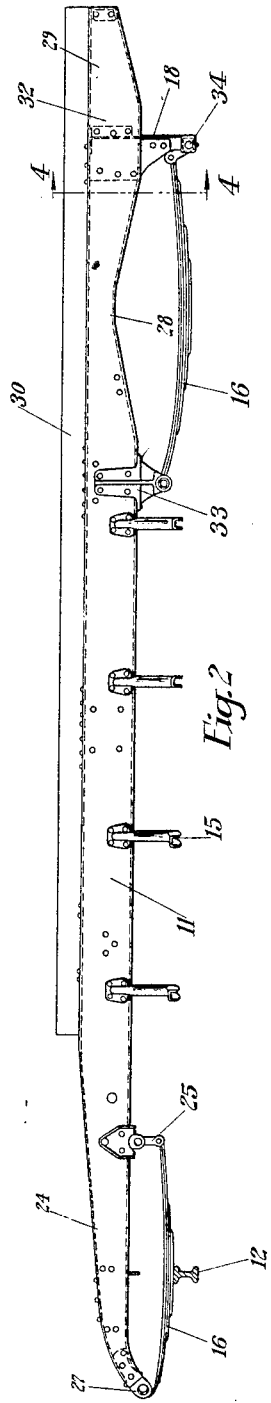
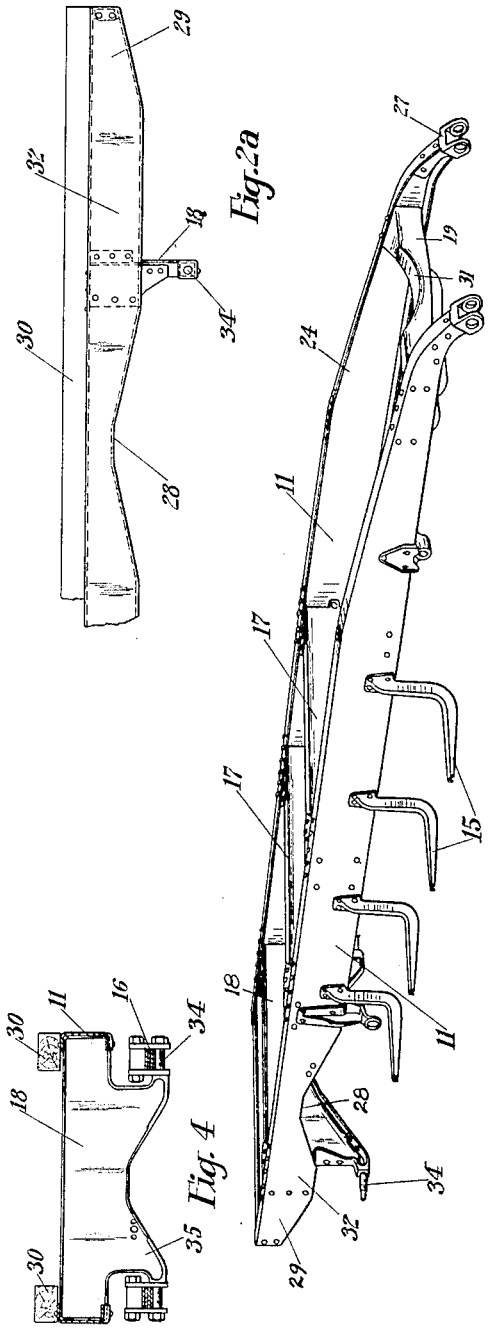
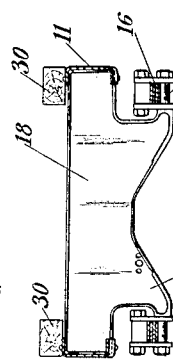
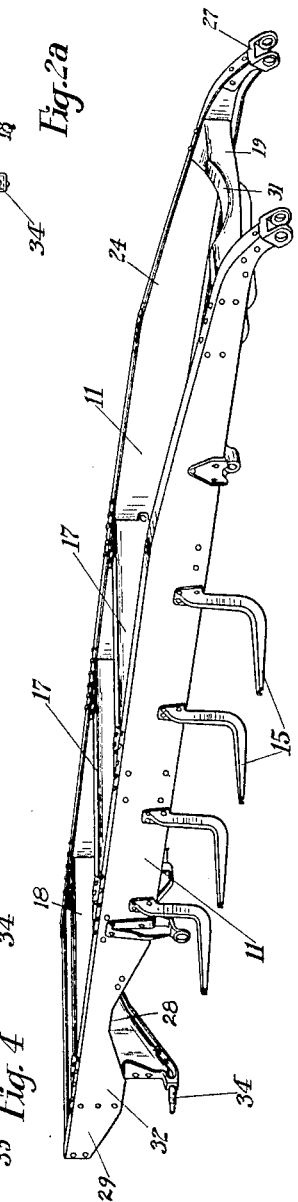
Inventor
ALFRED MOORHOUSE,
By Milton Tilletts,
Attorney Patented Sept. 10, 1929.

1,727,999

UNITED STATES PATENT OFFICE.

ALFRED MOORHOUSE, OF DETROIT, MICHIGAN. ASSIGNOR TO PACKARD MOTOR CAR COMPANY, OF DETROIT, MICHIGAN, A CORPORATION OF MICHIGAN.

MOTOR VEHICLE.

Application filed March 31, 1923. Serial No. 629,010.

This invention relates to motor vehicles and particularly to the frame construction. The particular frame shown is more especially adapted for a commercial vehicle. Its side members and cross members are made of pressed steel stampings.

In building commercial vehicles it is particularly desirable that the frame shall be suitable to take any one of several types of bodies. The vehicle or truck may be wanted for carrying heavy loads such as sand or coal, in which the frame may be short to take the necessarily small sized body, or it may be wanted for carrying bulky but light things such as furniture in which case the frame may be considerably lengthened out beyond the rear axle in order to accommodate a large and roomy body.

That part of the frame, therefore, which supports the body should preferably have its upper face or edge horizontal throughout its length so that it will be easy to adapt a body to it. It is one of the objects of this invention, therefore, to provide a motor vehicle frame having features adapting it to various types of bodies and to easy manufacture in different lengths. In the frame shown, the side bars of the rear portion of the frame have parallel upper and lower edges except that over the rear axle the lower edge is raised somewhat to provide greater clearance for the axle, and rearwardly of the rear spring attachment the lower edge is inclined upwardly. This leaves a horizontal section where the rear end of the rear spring is attached so that frames of various lengths may be easily made by simply having the die split at that point and inserting additional die blocks to form a lengthened horizontal portion of the side bar.

In building commercial vehicles, it is also desirable that the front springs shall be substantially horizontal so that the steering will be easier. Also, the motor should be mounted as low as possible and yet clear the front axle. It is therefore another object of the invention to provide a motor vehicle frame with a downwardly inclined part forward of the body supporting part. As illustrated herein, forward of the body portion of the frame the side bars, or their upper faces, take a downward slant or incline to thus bring the front end of the frame more nearly in a plane with the front axle so that the spring connected thereto may be nearly horizontal as it extends from the front end of the frame to the axle and rearwardly to the spring shackle. By thus inclining the front end of the frame the forward cross member is brought down to a point below the starting crank of the motor so that that cross member may be made straight on at least one of its edges, the lower edge, and thus more rigidly secure together the front ends of the frame side bars.

Another object of the invention is to provide a novel form of cross member for a motor vehicle frame.

In the drawing, one of the cross members of the frame is formed of a pressed steel stamping which is connected to both of the side bars and is provided with a downwardly extending web having outwardly projecting brackets for the spring shackles. This member is flanged all around and forms an unusually strong and rigid cross member as well as a support for the spring brackets.

Other objects of the invention will appear from the following description taken in connection with the drawings, which form a part of this specification, and in which:

Fig. 2 is a side elevation of the vehicle frame shown in Fig. 1;

Figure 1:
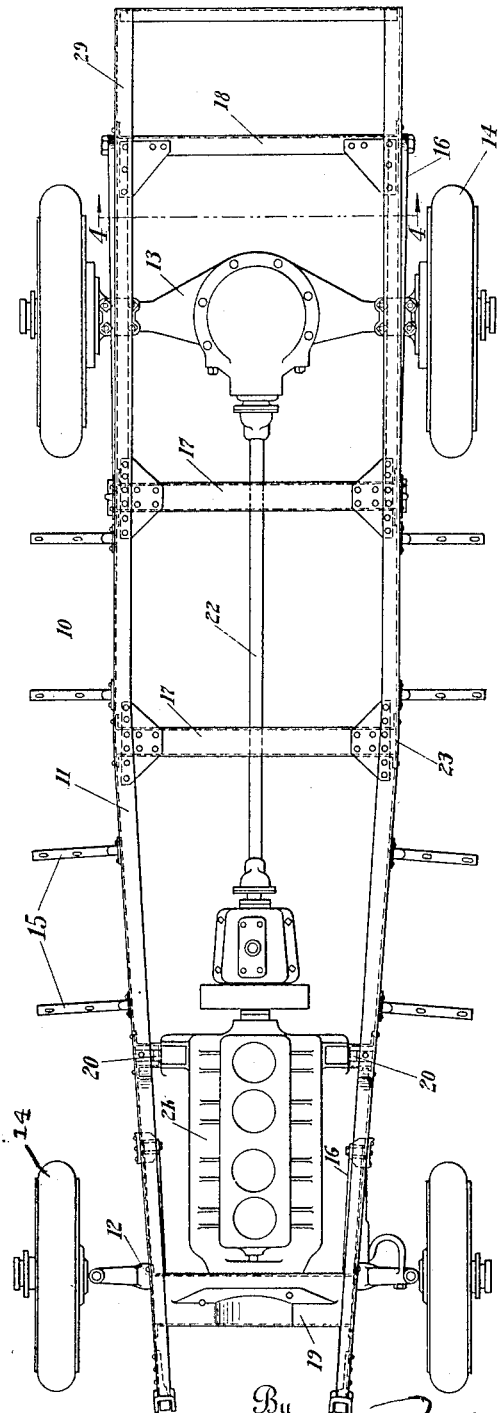
Fig. 1 is a plan view of a motor vehicle chassis embodying the invention.

Fig. 2ª illustrates the rear part of the frame shown in Fig. 1 with a slight elongation near the rear end thereof;

Fig. 3 is a perspective view of the frame shown in Figs. 1 and 2; and

Fig. 4 is a transverse section substantially on the lines 4—4 of Figs. 1 and 2.

Referring to the drawings, 10 represents generally the vehicle frame illustrated and 11 indicates the two side bars or side members of the frame. Preferably, these are of stamped or pressed steel having web portions and upper and lower flanges.

This frame is mounted on a front axle 12 and a rear axle 13, the axles being supported upon wheels 14. Springs 16 connect the axles to the frame and running board brackets 15 are shown as extending from the sides of the frame.

The middle parts of the frame side members are connected together by separated cross members 17 and adjacent the rear and front ends respectively of the frame are cross members 18 and 19.

A motor 21 is mounted at the front end of the frame, the front end of the motor being supported upon the cross member 19 and the rear part of the motor being connected to the frame by brackets 20. A propeller shaft 22 extends from the motor through a suitable clutch and gear box to the rear or driving axle 13.

That part of the frame which directly supports the body is provided with a horizontal upper edge. In Fig. 2 a body sill 30 is shown as supported upon the frame. This sill extends from approximately the rear supports of the motor to the extreme rear end of the frame and this may be said to be the body supporting part of the frame. Forwardly of the body supporting part the upper flange or edge of the frame slopes or inclines downwardly toward the front end as shown at 24, Figs. 2 and 3. Thus the extreme forward end 27 of the frame is brought down almost to a level with the front axle 12 so that the spring 16 extends practically horizontally to the axle 12 and rearwardly to the shackle 25. This straight spring makes the steering easier and by thus bringing the forward part of the frame well down towards the axle the cross member 19 may have a straight portion and be only slightly dished as shown at 31 and yet the motor may be mounted well down in the frame.

The whole rear portion of the frame has a horizontal upper face or flange so that the body sill 30 may be readily supported thereon without being cut away or otherwise especially made to fit the frame. The lower edge of the frame, however, is raised somewhat over the rear axle as shown at 28 to thus provide greater clearance for the axle at a point where strength in the frame is not especially required. However, where the ends of the rear spring 16 are connected to the frame the latter is of full width. This is particularly true of the part indicated at 32 where the upper and lower edges of the side bars are parallel. From this part to the end of the frame the side bars are tapered somewhat as indicated at 29, by inclining the lower edge upwardly.

In Fig. 2ª a frame having an elongated overhang, the overhang being the part extending rearwardly from the rear spring connection, is illustrated. Instead of making entirely new dies for this elongated frame, the same die can be used with the insertion of a block to elongate the part 32 only, and this of course is because of the parallel upper and lower edges of the frame at this point.

The front end of each rear spring 16 is connected to a bracket 33 on the frame side member and the rear end is connected to a bracket 34. These brackets 34 extend outwardly from a downwardly extending part 35 of the web of the cross member 18, above referred to. This member 18 is preferably formed of a steel stamping flanged all around and having the brackets 34 riveted to its downwardly extending part. The member is connected to the side members 11 of the frame as shown particularly in Figs. 1, 2 and 4. Thus a very rigid cross connection is provided for the frame and strong supports are provided for the springs.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A motor vehicle frame comprising side bars having the rear part which extends over the rear axle formed with horizontal upper edges, the lower edges of the side bars being raised over the rear axle and being parallel to the upper edges for a portion of the length of the frame rearwardly of the rear axle.

2. A motor vehicle frame comprising pressed steel side bars of channel section, the rear portion of each side bar which extends over the rear axle having a horizontal upper flange and having a lower flange raised over the rear axle and extending parallel to the upper flange for a short distance rearwardly of the rear axle.

3. A motor vehicle frame comprising pressed steel side bars of channel section, the rear portion of each side bar having a horizontal upper flange and having a lower flange parallel with the upper flange at a rear spring connection and inclined upwardly therefrom both front and rear.

4. In combination with a motor vehicle, a channel frame member having a main portion with an upper flange disposed in a horizontal plane for supporting a straight body sill, and a forward portion with an upper flange disposed in a plane inclined thereto, and a rear portion having a reduced section over the rear axle and a full section rearwardly of the rear axle.

5. A motor vehicle frame comprising side bars each having a part extending over the rear axle and formed with a horizontal plane upper edge, a cross frame member connecting the side bars rearwardly of the rear axle, the lower edge of each side bar being raised over the rear axle and being parallel to the upper plane edge for a portion of the length of the frame rearwardly of the cross frame member.

In testimony whereof I affix my signature.
ALFRED MOORHOUSE.